(12) United States Patent
Machino et al.

(10) Patent No.: US 7,051,075 B1
(45) Date of Patent: May 23, 2006

(54) ELECTRONIC MAIL APPARATUS

(75) Inventors: Satoshi Machino, Joyo (JP); Hiroshi Kurosaki, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 740 days.

(21) Appl. No.: 09/724,191

(22) Filed: Nov. 28, 2000

(30) Foreign Application Priority Data

Dec. 2, 1999 (JP) ............................... P11-343621

(51) Int. Cl.
*G06F 15/16* (2006.01)
(52) U.S. Cl. .................. 709/206; 709/207; 709/245; 709/246; 715/752
(58) Field of Classification Search ................ 709/206, 709/205, 207, 245, 246; 715/752
See application file for complete search history.

(56) References Cited

U.S. PATENT DOCUMENTS

| | | | |
|---|---|---|---|
| 5,937,162 A * | 8/1999 | Funk et al. .................. 709/206 |
| 5,974,448 A * | 10/1999 | Yamauchi et al. ........... 709/206 |
| 6,023,723 A * | 2/2000 | McCormick et al. ........ 709/206 |
| 6,128,646 A * | 10/2000 | Miloslavsky ................. 709/206 |
| 6,282,565 B1 * | 8/2001 | Shaw et al. .................. 709/206 |
| 6,442,589 B1 * | 8/2002 | Takahashi et al. ........... 709/203 |
| 6,615,241 B1 * | 9/2003 | Miller et al. ................. 709/206 |
| 6,823,368 B1 * | 11/2004 | Ullmann et al. ............. 709/206 |

FOREIGN PATENT DOCUMENTS

| | | |
|---|---|---|
| JP | 05219103 | 8/1993 |
| JP | 08316983 | 11/1996 |
| JP | 11212884 | 8/1999 |

\* cited by examiner

*Primary Examiner*—Yves Dalencourt
(74) *Attorney, Agent, or Firm*—David G. Conlin; George N. Chaclas; Edwards Angell Palmer & Dodge, LLP

(57) ABSTRACT

An e-mail apparatus enhancing the ease of operation. The e-mail messages are transmitted based on classification results to reduce the load of a user. The e-mail apparatus facilitates composing a body of a message, selecting registrant data for a prescribed area, selecting attributes and a setting for association with the body of the message, the attributes and the setting for determining a list of recipients of the message according to the registrant data in the prescribed area, and sending the message to the list of recipients.

13 Claims, 8 Drawing Sheets

FIG. 2

| REPRESENTATIVE | OTHERS | MAIL ADDRESS | |
|---|---|---|---|
| ......... | ......... | ......... | ......... |
| SUB-SECTION MANAGER SUZUKI | HAJIME SUZUKI, H. SUZUKI | h_suzuki@aaa.xyz.co.jp | ......... |
| ......... | ......... | ......... | ......... |
| CHIEF TAKAHASHI | MITSUKO TAKAHASHI | m_takaha@aaa.xyz.co.jp | ......... |
| SUB-SECTION MANAGER TANAKA | DAIGO TANAKA | d_tanaka@bbb.xyz.co.jp | ......... |
| CHIEF NAKAMURA | MUTSUMI NAKAMURA, M. NAKAMURA | m_nakamu@bbb.xyz.co.jp | ......... |
| ......... | ......... | ......... | ......... |
| CHIEF YAMAMOTO | TAKESHI YAMAMOTO | t_yamamo@aaa.xyz.co.jp | ......... |
| CHIEF YOSHIDA | SHINJI YOSHIDA | s_yoshida@aaa.xyz.co.jp | ......... |

11: DESTINATION TABLE
11a

FIG. 3

12: GROUP TABLE

| GROUP NAME | REGISTRANTS | |
|---|---|---|
| LEADER MEETING | (SUB-SECTION MANAGER NAKAMURA), (CHIEF YAMAMOTO) | (SUB-SECTION MANAGER TANAKA), (CHIEF YAMAMOTO) |
| GET-ACQUAINTED SOCIETY | (SUB-SECTION MANAGER SUZUKI), (CHIEF YOSHIDA) | (SUB-SECTION MANAGER SUZUKI), (CHIEF TAKAHASHI) |
| ...... | ...... | ...... |

◯◯◯ RESEARCH CENTER,
◯TH DEVELOPMENT SECTION

MEETING MINUTES

SUBJECT: _____
DATE: _____ PLACE: _____
ATTENDANTS: _____
_____

MEETING RESULTS:

| (FILE NAME) | (TEMPLATE) | ... | (GROUP) |
|---|---|---|---|
| LEADER MEETING-1 | 0 0 1 | | LEADER MEETING |

(B)

MEETING MINUTES

SUBJECT: FIRST LEADER MEETING

DATE: APRIL 1, 1999  PLACE: MEETING ROOM 4

ATTENDANTS: SUB-SECTION MANAGER SUZUKI,
SUB-SECTION MANAGER TANAKA,
CHIEF YAMAMOTO, [WRITTEN BY] KOBAYASHI

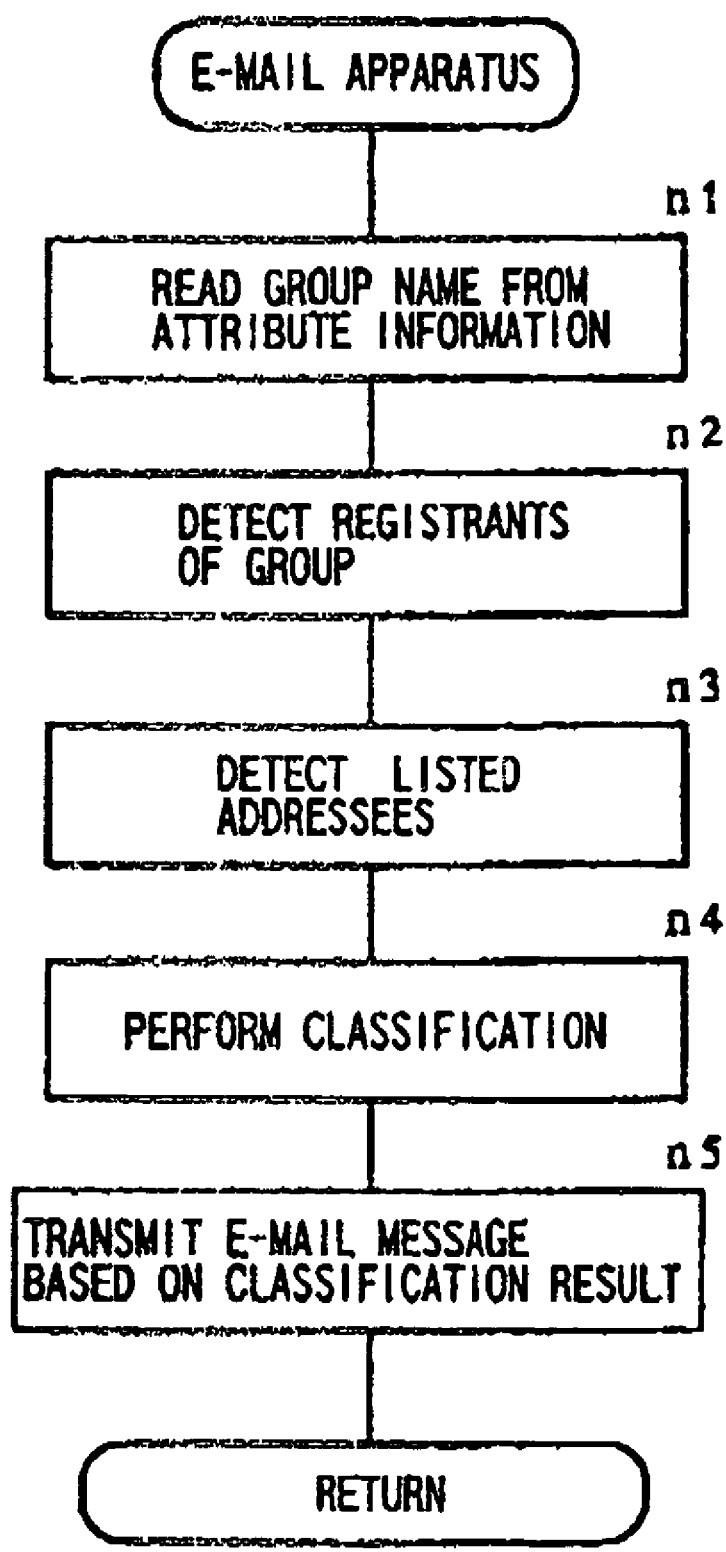

FIG. 8

MEETING MINUTES

SUBJECT: THIRD LEADER MEETING
DATE: AUGUST 2, 1999  PLACE: MEETING ROOM 4
ATTENDANTS: SUB-SECTION MANAGER SUZUKI,
CHIEF TAKAHASHI, CHIEF NAKAMURA,
[WRITTEN BY] KOBAYASHI

FIG. 9

CHIEF TAKAHASHI (m_takaha@aaa.xyz.co.jp) IS NOT A MEMBER.

- SHOULD HE OR SHE BE ADDED AS A NEW MEMBER?  [YES]  [NO]
- SHOULD PAST MAIL BE ATTACHED?  [YES]  [NO]  [DETAILS]

[EXECUTION]

ATTACHMENT MAIL LIST
- LEADER MEETING-1  99/4/2  9:25
- LEADER MEETING-2  99/6/2  9:37

ELECTRONIC MAIL APPARATUS

BACKGROUND OF THE INVENTION

1. Field of the Invention

The present invention relates to an electronic mail apparatus that manages the addresses of destinations of electronic mail (hereinafter referred to as "e-mail") and automatically judges a name and transmission method for each destination at the time of transmission.

2. Description of the Related Art

E-mail is a conventional method for communication between information processing apparatuses connected to a network. Personal computers and the like are used for transmitting and receiving e-mails (i.e., e-mail apparatuses). In transmitting an e-mail message, it is necessary to write the address of a destination in the e-mail message to be transmitted. A user may input an address through a keyboard in generating an e-mail message to be transmitted. However, in the case of a destination to which a user frequently transmits e-mail messages, not only it is a heavy load for the user to input the e-mail address of the destination in generating each e-mail message to be transmitted, but also it is impossible to prevent a transmission error due to erroneous input of the address.

In view of the above, conventional e-mail apparatuses have a function of registering destination information (such as in a destination table). In the destination table, the addresses and names of destinations are correlated with each other, and thereby upon designating a destination from among the registered destinations, the address of the designated destination is automatically added to an e-mail to be transmitted.

Recently, a generated e-mail, however, is often transmitted to a plurality of destinations, and accordingly e-mail apparatuses in which destinations of e-mail are managed in groups have been mainstreamed. An e-mail apparatus in which destinations of an e-mail are managed in groups is provided with the above-mentioned destination table. Additionally, a group table stores a group identification name and a plurality of destination names registered in the destination table. By designating a group of destinations of an e-mail message, the address of every destination which is registered as a member of the designated group is added to an e-mail and the e-mail message is transmitted to every destination.

Further, the following e-mail apparatuses have been proposed.

(1) An apparatus, disclosed in Japanese Unexamined Patent Publication JP-A 5-219103 (1993), shows destinations of e-mail being managed in groups. Registrants of a group are classified, based on exclusion information that is set before transmitting an e-mail message, into ones to whom the e-mail message needs to be transmitted and ones to whom the e-mail message need not be transmitted. The e-mail message is transmitted to only the registrants to whom it needs to be transmitted (i.e., the e-mail is not transmitted to the registrants to whom it need not be transmitted).

(2) An apparatus, disclosed in Japanese Unexamined Patent Publication JP-A8-316983 (1996), shows a function of registering a table in which keywords and destinations are correlated with each other. A person to whom an e-mail message needs to be transmitted is determined automatically based on a keyword that is included in the e-mail message, and the e-mail message is transmitted to the person thus determined.

(3) An apparatus, disclosed in Japanese Unexamined Patent Publication JP-A 11-212884 (1999), shows an e-mail message with an attachment file is transmitted to a particular destination among a plurality of destinations to whom the e-mail message needs to be transmitted.

In the apparatus (1), however, since exclusion information is input by a user, the exclusion information cannot be prevented from being erroneously inputted by a user. Accordingly the apparatus has a high possibility to transmit an e-mail message to a person to whom it need not be transmitted or to fail to transmit the e-mail message to a person to whom it needs to be transmitted. There is another problem that since a user needs to input exclusion information, the apparatus needs relatively high expenditures of time and labor in e-mail transmission and is inferior in operability.

In the apparatus (2), since the destination of an e-mail message is determined based on a keyword that is included in the e-mail message, a user needs to generate an e-mail message in consideration of the destination. As a result, more time and labor are needed to generate the e-mail message.

In the apparatus (3), a user specifies, for each person, whether to add an attachment file. Therefore, the apparatus has a high possibility to transmit, due to an erroneous specification, an attachment file to a person to whom it need not be transmitted or to fail to transmit the attachment file to a person to whom it needs to be transmitted. There is another problem that since a user needs to specify, for each person, whether to add an attachment file, the apparatus needs relatively high expenditures of time and labor in e-mail transmission and is inferior in operability.

SUMMARY

An object of the present invention is to provide an e-mail apparatus capable of enhancing ease of operation and preventing an e-mail transmission error.

In one embodiment, a method composes electronic mail message including the steps of composing a body of a message, selecting registrant data for a prescribed area, selecting attributes and a setting for association with the body of the message, the attributes and the setting for determining a list of recipients of the message according to the registrant data in the prescribed area, and sending the message to the list of recipients.

In another embodiment, a server processes electronic mail in communication with clients over a distributed computing network. The server includes a memory storing templates, rules for settings, group names associated with a plurality of registrants, and mail addresses related to the plurality of registrants. The processor is in communication with the memory and the distributed computing network. The processor is operative to i) read a setting and a group name from attribute information associated with an electronic mail message, ii) determine the plurality of registrants associated with the group name, iii) detect destinations in a prescribed region of the electronic mail message, iv) classify the plurality of registrants into a first group associated with the group name and a second group not associated with the group name, v) determine a list of recipients for the electronic mail message according to a rule associated with the setting, the rule being for determining whether the first and second groups receive the electronic mail message, and v) transmit the electronic mail message to the list of recipients.

In a preferred embodiment, an e-mail apparatus includes a storage section for storing a destination table. The destination table stores destination records, each destination record has an address of an e-mail destination and a destination notation. The storage section also includes a group table in which group records of an identification name of a group and one or a plurality of destinations. The e-mail apparatus further includes a control section having for classifying destinations. When a group is designated as a destination of an e-mail message, the control section classifies the designated group into destinations who are listed in the e-mail message to be transmitted and destinations who are not. Based upon the classification, the control section transmits the e-mail message to the appropriate recipients.

In another embodiment, the control section further has a function of designating a group of destinations as designations of the e-mail message based on attribute information of the e-mail message.

Preferably, the group of destinations is designated automatically based on attribute information of the e-mail message to be transmitted. Therefore, a burden imposed on a user is reduced.

It is preferable that the control section prohibit transmission of the e-mail message to the destinations which are listed in the e-mail message.

It is preferable that the destination classification function includes a function of subclassifying the destinations which are listed in the e-mail message to be transmitted based on a preset condition.

In another embodiment of, for example, it is possible to transmit meeting minutes to only persons who were absent from the meeting. Therefore, destinations are determined automatically in accordance with the property of an e-mail message to be transmitted and operability of the apparatus is more enhanced.

In a preferred embodiment, the destination classification function performs the classification depending on whether the destinations are listed in a prescribed region of the e-mail message to be transmitted. Usually, the names of persons to whom an e-mail message needs to be transmitted are written at a beginning part of the e-mail message. Therefore, the classification may be performed depending on whether destinations are listed in this region.

Preferably, even when a destination which is not correlated with a designated group is listed in an e-mail message, the e-mail message is also transmitted to the destination. Therefore, a user can transmit an e-mail message also to a person who does not belong to the designated group, merely by writing his name.

In a further embodiment, the storage section has a mail storage area for storing transmitted e-mails. When transmitting the e-mail message to the destination, e-mail messages stored in the mail storage area are attached to the outgoing message.

According to a preferred embodiment, when an e-mail message is transmitted to a person who does not belong to a designated group, e-mail messages that were transmitted to the registrants of the group in the past can be attached to the e-mail message.

In a preferred embodiment, when a destination which is not correlated with the designated group is listed in the e-mail message to be transmitted, the control section has a function of executing, a process of inquiring of a user whether to register the destination as a member of the designated group.

According to another embodiment, when a destination which is correlated with a designated group is listed in an e-mail message, an inquiry is made about whether to register the destination as a member of the designated group. Therefore, an individual who has newly joined a group can be registered easily.

It should be appreciated that the present invention can be implemented and utilized in numerous ways, including without limitation as a process, an apparatus, a system, a device, a method for applications now known and later developed or a computer readable medium. These and other unique features of the system disclosed herein will become more readily apparent from the following description and the accompanying drawings.

BRIEF DESCRIPTION OF THE DRAWINGS

Other and further objects, features, and advantages of the invention will be more explicit from the following detailed description taken with reference to the drawings wherein:

FIG. 2 shows a destination table provided in the e-mail apparatus according to the first embodiment of the invention;

FIG. 3 shows a group table provided in the e-mail apparatus according to the first embodiment of the invention;

FIG. 4 shows a template of meeting minutes;

FIGS. 6A and 6B show an example of a generated e-mail message;

FIG. 7 is a flowchart showing a process executed by the e-mail apparatus according to the first embodiment of the invention;

FIG. 8 shows another example of a generated e-mail message; and

FIG. 9 shows an example display on a display section of an e-mail apparatus according to a second embodiment of the invention.

DETAILED DESCRIPTION OF THE PREFERRED EMBODIMENTS

Figure 1:
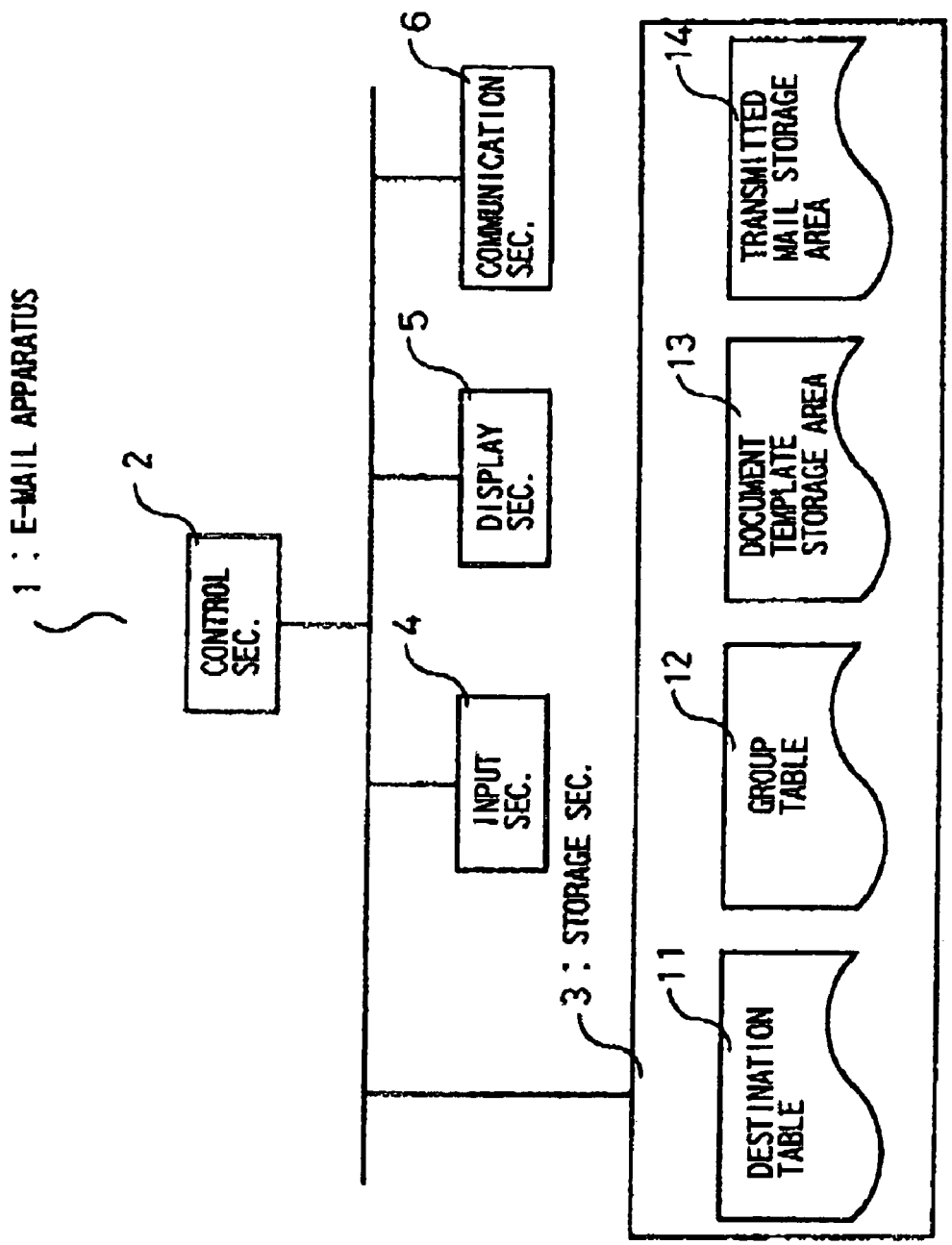
FIG. 1 is a block diagram showing the configuration of an e-mail apparatus according to a first embodiment of the invention.

Now referring to the drawings, preferred embodiments of the invention are described below.

FIG. 1 is a block diagram showing the configuration of an e-mail apparatus according to an embodiment of the invention. An e-mail apparatus 1 is provided with a control section 2 for controlling the operation of a main body, a storage section 3 having a destination table 11 and a group table 12 (described later), a document template storage area 13 in which templates of various documents such as meeting minutes are registered, a transmitted mail storage area 14 for storing transmitted e-mail etc., and other areas, an input section 4 having a mouse, a keyboard, etc., a display section 5 for performing display corresponding to an input manipulation on the input section 4, and a communication section 6 for controlling communication with a network.

As shown in FIG. 2, a destination table 11 stores destination records 11a having destination notations such as, without limitation, names and titles and a mail address (hereinafter referred to merely as "address"). The destination table 11 is stored in the storage section 3. The term "destination" as used herein means a name or the like that enables identification of an individual. Preferably, other notations in each destination record 11a enable identification of an individual that can be registered. For example, "Hajime Suzuki," "H. Suzuki," and other variations of this name can be registered as other notations correlated with "sub-section manager Suzuki," in a destination record 11a having "sub-section manager Suzuki" as a representative notation.

As shown in FIG. 3, group records 12a contain the name of the group and the representative notations of individuals (registrants) belonging to the group in the group table 12. Either a single person or a plurality of persons may be registered in each group. Templates of various documents are stored in the document template storage area 13. For example, as shown in FIG. 4, a meeting minutes template having fields in which to write a subject, a date, a place, attendants, meeting results, etc. can be stored in the document template storage area 13. A user can generate an e-mail message to be transmitted by using any of those templates.

Figure 5:
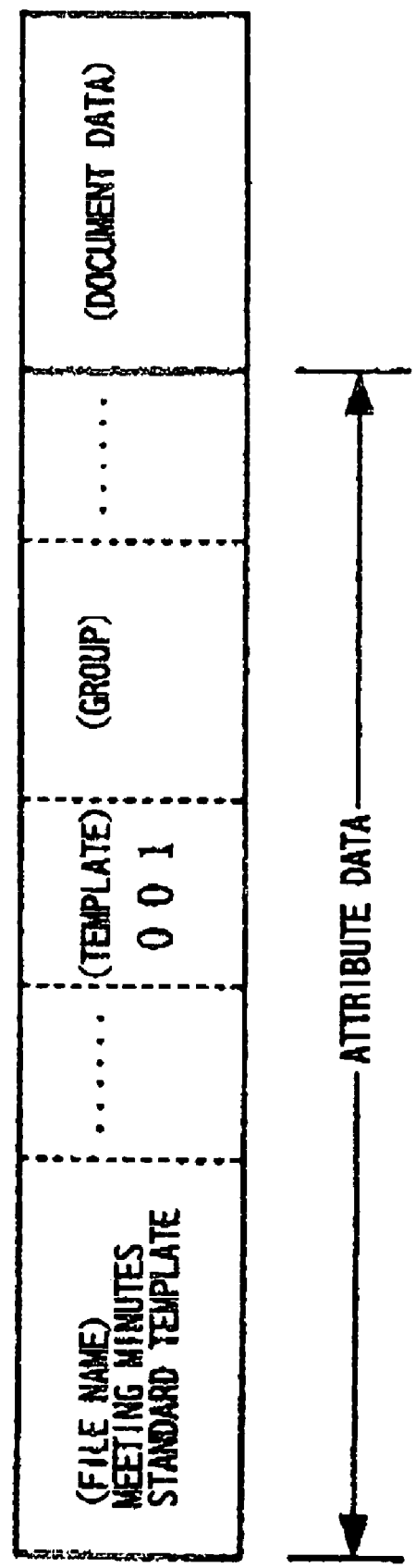
FIG. 5 shows the structure of a region to which attributes of a file are to be inputted.

As shown in FIG. 5, an e-mail message that has been generated by the e-mail apparatus according to this embodiment is provided with a region where attribute information or data such as a file name and a group name are to be inputted. A user can generate a template freely and a generated template can be stored in the document template storage area 13. An e-mail message can also be generated according to a form that is not stored as a template.

The operation of the e-mail apparatus 1 according to this embodiment will be hereinafter described. A user who wants to transmit an e-mail message generates an e-mail body. This may be done by using either a template stored in the document template storage area 13 or a unique form devised by the user. At this time, the user also inputs attribute information (a title name, a group name, etc.) of the generated e-mail message. The e-mail apparatus 1 may be so configured that a group name can be inputted by designating a group name that is registered in the group table 12. Also, the e-mail apparatus 1 may be so configured that a group name (or a destination name) is inputted automatically in a case where an e-mail massage is generated by using a template that is stored in the document template storage area 13. Specifically, in the document template storage area 13, a template may contain a group name as attribute information.

FIGS. 6A and 6B show an example e-mail message generated by a user. FIG. 6A shows the attribute information of the generated e-mail message and FIG. 6B shows an e-mail body. In the e-mail message of FIGS. 6A and 6B, "Leader meeting" is inputted as a group name (attribute information).

When the user who has completed the generation of the e-mail message makes, through the input section 4, an input that commands transmission of the e-mail massage, a process of transmitting the generated e-mail message is executed. FIG. 7 is a flowchart showing a mail transmission process of the e-mail apparatus 1 according to this embodiment. The e-mail apparatus 1 reads out a group name (in this example of FIGS. 6A and 6B, "Leader meeting") from attribute information at step n1. At step n2, the e-mail apparatus 1 detects registrants of the group from the group table 11.

At step n3, the e-mail apparatus 1 detects destinations that are listed in a prescribed region of the e-mail to be transmitted (i.e., the e-mail that has been generated by the user). The prescribed region may be set on an e-mail message basis. For example, a region where to input information indicating the prescribed region may be provided in the attribute information. For example, in the case of the meeting minutes of FIGS. 6A and 6B, the region where to write attendant names may be made the prescribed region. The registrants of "Leader meeting" are four persons of "Sub-section manager Suzuki," "Sub-section manager Tanaka," and "Chief Nakamura," and "Chief Yamamoto." In the meeting minutes of FIGS. 6A and 6B, only three persons of "Sub-section manager Suzuki," "Sub-section manager Tanaka," and "Chief Yamamoto" are written as attendants but "Chief Nakamura" is not written because he was absent.

At step n4, the e-mail apparatus 1 classifies the registrants of the group that were detected at step n3 into persons (i.e., destinations) who are listed in the prescribed region of the e-mail message and persons who are not. In this example, at step n4, the e-mail apparatus 1 makes classification into the three persons of "Sub-section manager Suzuki," "Sub-section manager Tanaka," and "Chief Yamamoto" and the single person of "Chief Nakamura." At step n5, the e-mail apparatus 1 transmits the e-mail message based on the classification result of step n4.

At step n5, an e-mail transmission method etc. may be determined in accordance with the property of the e-mail message to be transmitted. Exemplary e-mail transmission methods are as follows.

(1) If the purpose of transmission of the e-mail message is confirmation of the contents of generated meeting minutes, the meeting minutes (e-mail message) need to be transmitted to attendants of the meeting but need not be transmitted to persons who were absent. In this case, a setting is possible that the e-mail message is transmitted to persons (i.e., destinations) who are listed in the prescribed region of the e-mail message and is not transmitted to the other persons (i.e., persons who were absent). With this setting, the transmission of the e-mail can be done automatically in such a manner that the e-mail message is transmitted to the three persons of "Sub-section manager Suzuki," "Sub-section manager Tanaka," and "Chief Yamamoto" who attended the meeting and is not transmitted to "Chief Nakamura" who was absent.

The address of a person to whom the e-mail should be transmitted is obtained by searching the destination table 11. The e-mail apparatus 1 according to this embodiment automatically adds, to the e-mail message, an address that has been acquired by searching the destination table 11.

(2) If meeting minutes were handed to attendants at the end of the meeting and the purpose of transmission of the e-mail message is to transmit the meeting minutes to persons who were absent, the meeting minutes (e-mail message) need not be transmitted to the attendants and need to be transmitted to the persons who were absent. In this case, a setting is possible that the e-mail message is not transmitted to the persons (destinations) who are listed in the prescribed region of the e-mail message and is transmitted to the other persons (i.e., the persons who were absent). With this setting, the transmission of the e-mail message can be done automatically in such a manner that the e-mail message is not transmitted to the three persons of "Sub-section manager Suzuki," "Sub-section manager Tanaka," and "Chief Yamamoto" who attended the meeting and is transmitted to "Chief Nakamura" who was absent.

(3) Another setting is possible that the e-mail message is transmitted as an original (To: transmission) to persons (destinations) who are registrants of the group detected at step n2 and are listed in the prescribed region of the e-mail message detected at step n3 and the e-mail message is transmitted as a copy (CC: transmission) to persons who are not listed in the prescribed region of the e-mail message detected at step n3. With this setting, in the example being considered, the transmission can be done in such a manner that the e-mail message is transmitted as an original to the three persons of "Sub-section manager Suzuki," "Sub-section manager Tanaka," and "Chief Yamamoto" who attended the meeting and is transmitted as a copy to "Chief Nakamura" who was absent.

(4) If an attachment file was handed to attendants at the time of a meeting, a setting is possible that the e-mail message is transmitted without the attachment file to persons (destinations) who are registrants of the group detected at step n2 and are listed in the prescribed region of the e-mail message detected at step n3 and the e-mail message is transmitted with the attachment file to persons who are not listed in the prescribed region of the e-mail message detected at step n3. With this setting, the e-mail message is transmitted without an attachment file to the three persons of "Sub-section manager Suzuki," "Sub-section manager Tanaka," and "Chief Yamamoto" who attended the meeting and is transmitted with the attachment file to "Chief Nakamura" who was absent. That is, an attachment file can be transmitted to only persons who were absent and hence were not handed the attachment file.

(5) Still another setting is possible that the e-mail message is transmitted as BCC: transmission to a person (who is not necessarily a registrant of the group) who is listed in the prescribed region of the e-mail as a destination with a prescribed mark or notation such as "[written by]" or "[secretariat]." This setting allows even a person who has written meeting minutes, a secretariat, or the like to manage the meeting minutes.

The transmission-completed e-mail message is stored in the transmitted mail storage area 14.

Since as described above proper destinations and a proper transmission method (To:, CC:, or BCC: transmission, with or without an attachment file, etc.) vary in accordance with the property of an e-mail message to be transmitted, the e-mail apparatus 1 may be so configured as to allow a user to make one of settings (1)–(5) freely. For example, when a user has commanded transmission of an e-mail message, the e-mail apparatus 1 inquires of the user which of settings (1)–(5) to select on the display section 5. With this measure, the only manipulation that the user should perform is to select (i.e., designate) a setting and hence the load of the user is not increased.

Another embodiment of the invention will be described below. An e-mail apparatus 1 according to this embodiment is similar to the e-mail apparatus 1 according to the first embodiment and different from the latter in being additionally provided with a process that is executed when the name of a destination who is not a registrant of a designated group is written in the prescribed region of an e-mail message.

Specifically, when the name of a destination who is not a registrant of a designated group is written in the prescribed region of an e-mail message, the e-mail apparatus 1 acquires an address that is correlated with this destination by searching the destination table 11 and transmits the e-mail message to the acquired address. The e-mail apparatus 1 may be so configured that an e-mail transmission method (To:, CC:, or BCC: transmission or the like) suitable for the property of an e-mail message to be transmitted can be set.

For example, in the case of transmitting meeting minutes shown in FIG. 8, the above-described process allows the meeting minutes to be also transmitted to "Chief Takahashi" who is listed as an attendant but is not registered as a member of the group "Leader meeting." Therefore, the meeting minutes can be transmitted to "Chief Takahashi" in a situation that he attended the meeting as a guest or that he newly joined the group but the group table 12 has not been updated accordingly yet.

When the name of a destination who is not a registrant of a designated group is written in the prescribed region of an e-mail message, a picture (as shown in FIG. 9) that inquires of a user whether to register this destination as a member of the group may be displayed on the display section 5. At this time, if the user inputs an instruction to the effect that the destination should be registered as a member of the group, the destination is registered in the corresponding group record 12a. Therefore, when the members of a group have changed by, for example, addition of a new member, the group table 12 can be updated easily and ease of operation of a user is more enhanced. Further, as shown in FIG. 9, the picture may include a portion that inquires of the user whether materials that have been generated so far should be transmitted to the new member as attachments to the e-mail message. With this measure, the past materials of the group can be transmitted to the new member and hence the new member can easily recognize the past situations of the group. The past materials of the group are stored in the transmitted mail storage area 14.

In the above embodiments, all the destination names written in the e-mail message are representative notations. A similar operation is performed even if a destination name is a notation that is registered in a destination record 11a as not being a representative notation.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A method for composing electronic mail message comprising the steps of:
   (a) composing a body of a message;
   (b) selecting registrant data for a prescribed area;
   (c) selecting attributes and a setting for association with the body of the message, the attributes and the setting for automatically determining a list of recipients of the message according to the registrant data in the prescribed area;
   (d) sending the message to the list of recipients and wherein the setting is selected from a group consisting of transmitting the message only to destinations identified in the prescribed area; transmitting the message to destinations identified in the prescribed area plus any additional destinations associated with the attributes; and transmitting the message only to the additional destinations associated with the attributes.

2. A method as recited in claim 1, wherein the attributes are a group name, file name and template.

3. A server for processing electronic mail in communication with clients over a distributed computing network, the server comprising:
   (a) a memory storing templates, rules for settings, group names associated with a plurality of registrants, and mail addresses related to the plurality of registrants; and
   (b) a processor being in communication with the memory and the distributed computing network, wherein the processor is operative to:
      (i) read a setting and a group name from attribute information associated with an electronic mail message;

(ii) determine the plurality of registrants associated with the group name;
(iii) detect destinations in a prescribed region of the electronic mail message;
(iv) classify the plurality of registrants into a first group associated with the group name and a second group not associated with the group name;
(v) determine a list of recipients for the electronic mail message according to a rule associated with the setting, the rule being for determining whether the first and second groups receive the electronic mail message;
(vi) transmit the electronic mail message to the list of recipients and wherein the setting is selected from a group consisting of transmitting the message only to destinations identified in the prescribed area; transmitting the message to destinations identified in the prescribed area plus any additional destinations associated with the attributes; and transmitting the message only to the additional destinations associated with the attributes.

4. A server as recited in claim 3, wherein the prescribed region is within the attribute information.

5. A server as recited in claim 3, wherein the electronic mail message includes an attachment, and the processor is further operative to determine a list of recipients for the attachment based upon applying the rule associated with the setting.

6. A server as recited in claim 3, wherein the setting is selected from a plurality of options by a user who composed the electronic mail message, each option having a rule associated therewith.

7. A server as recited in claim 6, the processor is further operative to classify a third group being destinations associated with the group name but not part of the plurality of registrants.

8. A server as recited in claim 7, wherein the rules are selected from the group consisting of: the list of recipients is the first group; the list of recipients is the second group; and the list of recipients is the first and second group with a carbon copy to the third group.

9. An e-mail apparatus comprising:
first means for composing a body of a message;
second means for selecting registrant data for a prescribed area;
third means for selecting attributes and a setting for association with the body of the message, the attributes and the setting for determining, without user intervention, a list of recipients of the message according to the registrant data in the prescribed area; and
fourth means for sending the message to the list of recipients and wherein the setting is selected from a group consisting of transmitting the message only to destinations identified in the prescribed area; transmitting the message to destinations identified in the prescribed area plus any additional destinations associated with the attributes; and transmitting the message only to the additional destinations associated with the attributes.

10. An e-mail apparatus as recited in claim 9, wherein the first means is a desktop computer.

11. An e-mail apparatus as recited in claim 9, wherein the second means is a desktop computer.

12. An e-mail apparatus as recited in claim 9, wherein the third means is a desktop computer.

13. An e-mail apparatus as recited in claim 9, wherein the first means is a computer in communication with a distributed computing network.

\* \* \* \* \*